(12) United States Patent
Kamiyama et al.

(10) Patent No.: US 8,682,727 B2
(45) Date of Patent: Mar. 25, 2014

(54) ADVERTISEMENT DISTRIBUTION SYSTEM, ADVERTISEMENT DISTRIBUTION DEVICE, ADVERTISMENT DISTRIBUTION METHOD, ADVERTISEMENT DISTRIBUTION PROGRAM, AND COMPUTER READABLE RECORD MEDIUM RECORDED WITH ADVERTISEMENT DISTRIBUTION PROGRAM

(75) Inventors: Yasuhiro Kamiyama, Tokyo (JP); Masahiro Morita, Tokyo (JP)

(73) Assignee: Rakuten, Inc., Shinagawa-ku, Tokyo (JP)

( * ) Notice: Subject to any disclaimer, the term of this patent is extended or adjusted under 35 U.S.C. 154(b) by 385 days.

(21) Appl. No.: 12/994,134

(22) PCT Filed: Jul. 31, 2009

(86) PCT No.: PCT/JP2009/003655
§ 371 (c)(1), (2), (4) Date: Nov. 22, 2010

(87) PCT Pub. No.: WO2010/023821
PCT Pub. Date: Mar. 4, 2010

(65) Prior Publication Data
US 2011/0071906 A1 Mar. 24, 2011

(30) Foreign Application Priority Data
Aug. 28, 2008 (JP) ................................. 2008-219558

(51) Int. Cl.
*G06Q 30/00* (2012.01)

(52) U.S. Cl.
USPC ................... 705/14.66; 705/14.19; 705/14.5; 705/14.58

(58) Field of Classification Search
USPC ........................................................... 705/14
See application file for complete search history.

(56) References Cited

U.S. PATENT DOCUMENTS

| | | | |
|---|---|---|---|
| 5,870,546 A | 2/1999 | Kirsch | |
| 2001/0054004 A1* | 12/2001 | Powers | 705/14 |
| 2002/0010757 A1* | 1/2002 | Granik et al. | 709/218 |
| 2003/0191685 A1* | 10/2003 | Reese | 705/14 |
| 2003/0196206 A1* | 10/2003 | Shusman | 725/91 |
| 2003/0233278 A1* | 12/2003 | Marshall | 705/14 |
| 2004/0215699 A1* | 10/2004 | Purang et al. | 709/201 |
| 2005/0128304 A1* | 6/2005 | Manasseh et al. | 348/207.99 |
| 2007/0061363 A1* | 3/2007 | Ramer et al. | 707/104.1 |
| 2008/0183541 A1* | 7/2008 | Wenger et al. | 705/8 |
| 2008/0189110 A1* | 8/2008 | Freeman et al. | 704/251 |
| 2009/0271281 A1* | 10/2009 | Kang | 705/26 |

FOREIGN PATENT DOCUMENTS

| | | |
|---|---|---|
| JP | 2001-297136 | 10/2001 |
| JP | 2002-117292 | 4/2002 |
| JP | 2002-236833 | 8/2002 |
| JP | 2003-050846 | 2/2003 |

* cited by examiner

*Primary Examiner* — John G Weiss
*Assistant Examiner* — Vincent Cao
(74) *Attorney, Agent, or Firm* — Paul A. Guss

(57) ABSTRACT

A travel support server (5) distributes a first e-mail to a user terminal device (2-*k*). The first e-mail has a link to the URL in which transfer function to a web page of a tourism resource corresponding to the user position in a travel destination and user information are embedded. An advertisement server (6) distributes a second e-mail to the user terminal device (2-*k*). The second e-mail has advertisement information which is provided to the user identified by selecting the link in the first e-mail.

11 Claims, 8 Drawing Sheets

FIG.5

| USER ID | FLAG | ADULT | CHILD | ACCOMMODATION RESERVATION DATE | ACCOMMODATION FACILITY ID | ACCOMMODATION FACILITY LOCATION | CHECK-IN | CHECK-OUT | DEPARTURE PLACE FOR OUTWARD JOURNEY | DEPARTURE TIME FOR OUTWARD JOURNEY | FLIGHT NUMBER | ARRIVAL PLACE FOR OUTWARD JOURNEY | ARRIVAL TIME FOR OUTWARD JOURNEY | DEPARTURE PLACE FOR HOMEWARD JOURNEY | DEPARTURE TIME FOR HOMEWARD JOURNEY | FLIGHT NUMBER | ARRIVAL PLACE FOR HOMEWARD JOURNEY | ARRIVAL TIME FOR HOMEWARD JOURNEY |
|---|---|---|---|---|---|---|---|---|---|---|---|---|---|---|---|---|---|---|
| 100100 | | 2 | 0 | 2008/5/1 | 111111 | LONGITUDE, LATITUDE | 2008/5/1:15:00 | 2008/5/2:10:00 | HANEDA | 2008/5/1:10:00 | ANA100 | NAHA | 2008/5/1:12:00 | NAHA | 2008/5/2:14:00 | ANA200 | HANEDA | 2008/5/2:16:00 |
| 200200 | | 2 | 2 | 2008/5/1 | 555555 | LONGITUDE, LATITUDE | 2008/5/1:16:00 | | | | | | | | | | | |
| 200200 | | 2 | 2 | 2008/5/2 | 555555 | LONGITUDE, LATITUDE | | 2008/5/3:10:00 | | | | | | | | | | |
| 300300 | | 1 | 0 | 2008/5/3 | 666666 | LONGITUDE, LATITUDE | 2008/5/3:15:00 | 2008/5/4:10:00 | CHITOSE | 2008/5/3:9:15 | JAL123 | ITAMI | 2008/5/3:11:00 | ITAMI | 2008/5/4:18:00 | JAL124 | CHITOSE | 2008/5/4:19:45 |
| ... | ... | ... | ... | ... | ... | ... | ... | ... | ... | ... | ... | ... | ... | ... | ... | ... | ... | ... |

16

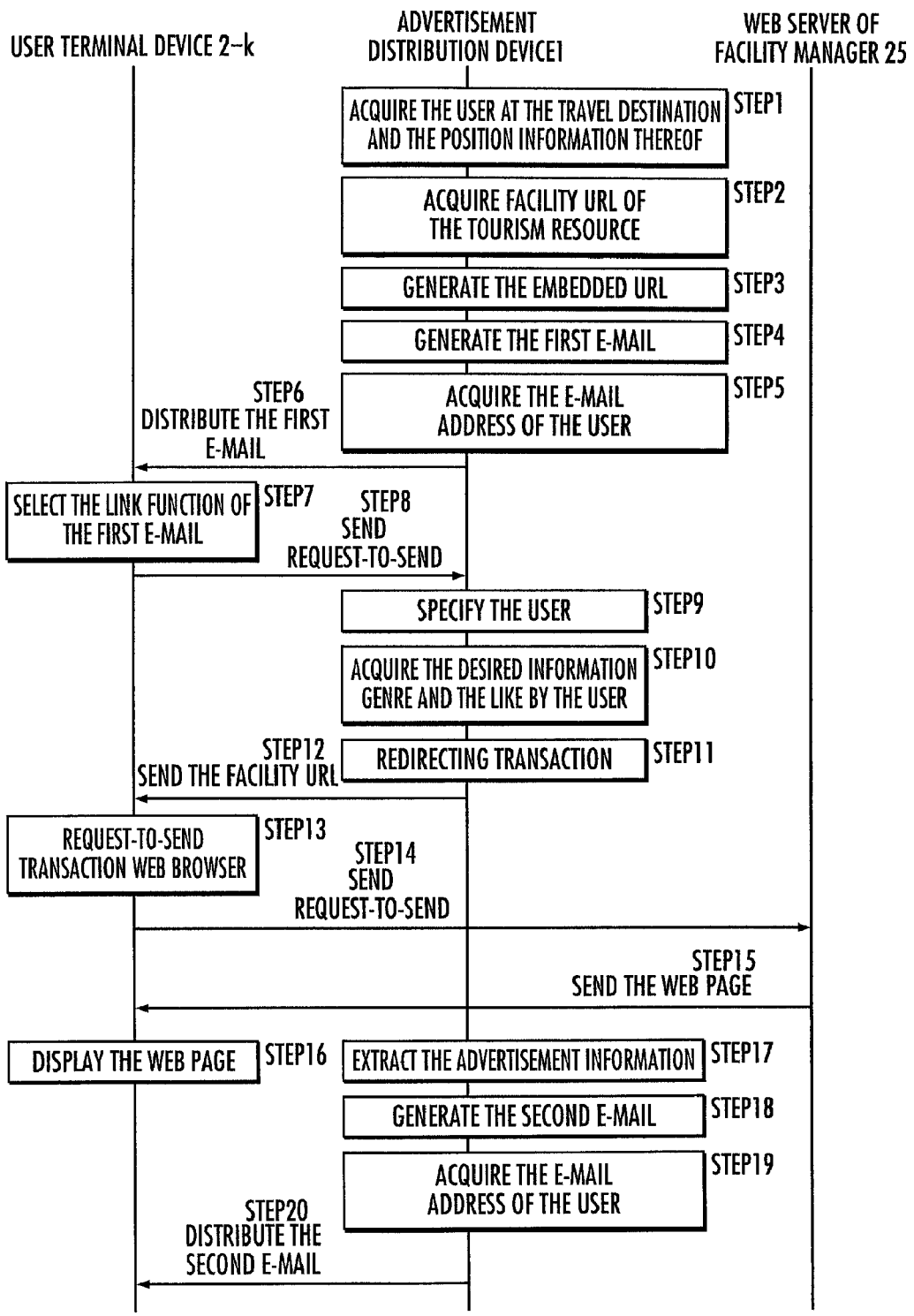

ADVERTISEMENT DISTRIBUTION SYSTEM, ADVERTISEMENT DISTRIBUTION DEVICE, ADVERTISMENT DISTRIBUTION METHOD, ADVERTISEMENT DISTRIBUTION PROGRAM, AND COMPUTER READABLE RECORD MEDIUM RECORDED WITH ADVERTISEMENT DISTRIBUTION PROGRAM

PRIORITY CLAIM

The present application is based on and claims the priority benefit of Japanese Patent Application 2008-219558 filed on Aug. 28, 2008, the contents of which are incorporated herein by reference in its entirety.

BACKGROUND OF THE INVENTION

1. Field of the Invention

The present invention relates to an advertisement distribution system configured to distribute advertisements to a user terminal device connected to a network, and advertisement distribution device, an advertisement distribution method, and advertisement distribution program, and a computer readable record medium recorded with the advertisement distribution program.

2. Description of the Related Art

Hitherto, there has been known a system in which a user performs accommodation reservation of an accommodation facility from a terminal device connected to a network such as an internet network on the basis of information on a web page or the like provided by a web server (for example, refer to Japanese Patent Laid-Open No. 2002-236833).

In recent years, sending and receiving e-mails and browsing web pages have been commonly performed on a portable terminal device such as a mobile phone. Even in a travel destination, a user can obtain various types of tourism information easily. Thereby, there has been disclosed a system in which a user preliminarily stores personal data containing a travel schedule and the like in a travel support server and the system managing the travel support server sends tourism information or the like of the travel destination at predefined time intervals to the portable terminal device according to position information stored in the travel schedule or sent from a portable terminal device with GPS function (for example, refer to Japanese Patent Laid-Open No. 2003-50846).

According thereto, it enables the user to easily obtain information such as a tourism facility or a restaurant corresponded to a time and a location in the travel destination, supports the user's action in the travel destination, and improves advertising effect of the tourism facility, the restaurant or the like.

However, it is impossible for the abovementioned system to select the optimum information according to the needs of the user, and thereby, information to be provided to the user is not completely refined, and as a result thereof, most of the information is not suitable to the needs of the user. Thus, the user has to select desired information from a large amount of information sent to the portable terminal device, which makes the user feel troublesome and inconvenient to use the system. Further, when information of a restaurant or the like in which the user has no interest is provided, the CTR (Click Through Rate) thereof may be decreased.

SUMMARY OF THE INVENTION

The present invention has been accomplished in view of the aforementioned problems, and it is therefore an object of the present invention to provide an advertisement distribution system, an advertisement distribution device, an advertisement distribution method, an advertisement distribution program, and a computer readable record medium recorded with the advertisement distribution program, which can refine with certainty useful advertisement information to be provided through distribution to a user traveling in a travel destination without using GPS function installed in a portable terminal device so as to enable the user to easily obtain the advertisement information meeting the user's needs and offer a high advertising effect to an advertiser.

To attain an object described above according to the present invention, there is provided an advertisement distribution system which is provided with a user terminal device accessible to a network, an advertisement database registered with a plurality of advertisement information in association with location information, and an advertisement server configured to distribute advertisement information extracted from the advertisement database to the user terminal device via the network. The advertisement distribution system of the present invention comprises: a user information database configured to store user information; a reservation information database configured to store travel reservation information of the user in association with the user information; a tourism resource database registered with a plurality of tourism resource information in association with the location information; and a travel support server configured to extract tourism resource information from the tourism resource database, the travel support server is provided with a tourism resource information extraction unit configured to extract the tourism resource information in association with a position of the user at a predefined time specified from a travel schedule contained in the travel reservation information stored in the reservation information database from the tourism resource database according to location information contained in the tourism resource information; an embedded URL generation unit configured to generate an embedded URL embedded with a transfer function to the URL of a web page contained in the tourism resource information extracted by the tourism resource information extraction unit and user identification information contained in the user information; a first e-mail generation unit configured to generate a first e-mail having a link function to the embedded URL generated by the embedded URL generation unit; and a first e-mail distribution unit configured to distribute the first e-mail generated by the first e-mail generation unit to the user terminal device, the advertisement server is provided with a user specification unit configured to specify the user according to the user identification information extracted from the embedded URL when the link function of the first e-mail distributed to the user terminal device is operated through selection; a location information specification unit configured to specify location information in association with the tourism resource information denoted by the embedded URL operated through selection; an advertisement information extraction unit configured to extract advertisement information to be provided to the user specified by the user specification unit from the advertisement database according to the location information specified by the location information specification unit; a second e-mail generation unit configured to generate a second e-mail containing the advertisement information extracted by the advertisement information extraction unit; and a second e-mail distribution unit configured to distribute the second e-mail generated by the second e-mail generation unit to the user terminal device of the user specified by the user specification unit.

According to the advertisement distribution system of the present invention, the first e-mail is distributed by the first e-mail distribution unit of the travel support server to the user terminal device of a user in the travel destination, and thereafter, the second e-mail is distributed thereto by the second e-mail distribution unit of the advertisement server. The travel support server is provided with the embedded URL generation unit configured to generate an embedded URL embedded with a transfer function to the URL of a web page contained in the tourism resource information and user identification information contained in the user information. The URL of a web page contained in the tourism resource information is stored in the tourism resource database and is extracted by the tourism resource information extraction unit. The tourism resource information extraction unit specifies the tourism resource information in association with a position of the user at a predefined time. In other words, the actions of a user in the travel destination can be specified by referring to the travel schedule contained in the travel reservation information stored in the reservation information database. The first e-mail generated by the first e-mail generation unit is offered with the link function to the embedded URL generated by the embedded URL generation unit, and the first e-mail is distributed by the first e-mail distribution unit to the user terminal device of the user in the travel destination.

When the user operates through selection the link function of the first e-mail distributed to the user terminal device, the web page of the tourism resource is sent to the user terminal device by the transfer function of the embedded URL. Meanwhile, the user specification unit extracts the user identification information embedded in the embedded URL and specifies the user. Thereby, it can be confirmed that the user is traveling according to the travel schedule, and the advertisement information extraction unit in the advertisement server can refine with certainty advertisement information that should be provided to the user according to the location information contained in the tourism resource selected by the user and extract it from the advertisement database. Thereafter, the second e-mail generation unit generates the second e-mail containing the advertisement information extracted by the advertisement information extraction unit. The second e-mail distribution unit distributes the second e-mail to the user terminal device of the specified user; thereby, the optimum advertisement information can be provided to the user by the second e-mail. As a result thereof, the user can obtain information meeting the needs thereof from the advertisement information contained in the second e-mail, and the advertiser can have the CTR of an advertisement provided by the second e-mail improved.

It is preferable that in the advertisement distribution system, the advertisement server is provided with a genre specification unit configured to specify a genre in association with the tourism resource information denoted by the embedded URL operated through selection; the advertisement information is registered in association with a genre in the advertisement database; the tourism resource information is registered in association with a genre in the tourism resource database; and the advertisement information extraction unit extracts the advertisement information further according to the genre specified by the genre specification unit. According thereto, the advertisement information is associated with the genre of the selected tourism resource, which enables useful information to be provided to the user.

It is preferable that the advertisement distribution system of the present invention is further provided with a travel merchandise database registered with a plurality of travel merchandise information; and a travel reservation server configured to provide reservable travel merchandise information extracted from the travel merchandise database to the user terminal device via the network, extract the user information and generate travel reservation information in association with the user according to a response from the user terminal device, wherein the travel reservation server is configured to register the user information in the user information database and the travel reservation information in the reservation information database. Owing to the travel reservation server, the travel reservation information and the user information of the user can be extracted effectively and certainly in conjunction with the reservation of travel merchandise offered to the user terminal device.

The present invention provides an advertisement distribution device which is connected by a user terminal device via a network, and is provided with an advertisement information storing unit stored with a plurality of advertisement information in association with location information and an advertisement distribution unit configured to distribute advertisement information extracted from the advertisement information storing unit to the user terminal device. The advertisement distribution device of the present invention comprises: a user information storing unit configured to store user information; a reservation information storing unit configured to store travel reservation information of the user in association with the user information; a tourism resource storing unit preliminarily stored with a plurality of tourism resource information in association with location information; a tourism resource information extraction unit configured to extract the tourism resource information in association with a position of the user at a predefined time specified from a travel schedule contained in the travel reservation information stored in the reservation information storing unit from the tourism resource storing unit according to location information contained in the tourism resource information; an embedded URL generation unit configured to generate an embedded URL embedded with a transfer function to the URL of a web page contained in the tourism resource information extracted by the tourism resource information extraction unit and user identification information contained in the user information; a first e-mail generation unit configured to generate a first e-mail having a link function to the embedded URL generated by the embedded URL generation unit; a first e-mail distribution unit configured to distribute the first e-mail generated by the first e-mail generation unit to the user terminal device; a user specification unit configured to specify the user according to the user identification information extracted from the embedded URL when the link function of the first e-mail distributed to the user terminal device is operated through selection; a location information specification unit configured to specify location information in association with the tourism resource information denoted by the embedded URL operated through selection; an advertisement information extraction unit configured to extract advertisement information to be provided to the user specified by the user specification unit from the advertisement information storing unit according to the location information specified by the location information specification unit; a second e-mail generation unit configured to generate a second e-mail containing the advertisement information extracted by the advertisement information extraction unit; and a second e-mail distribution unit configured to distribute the second e-mail generated by the second e-mail generation unit to the user terminal device of the user specified by the user specification unit.

According to the advertisement distribution device of the present invention, the first e-mail is distributed by the first e-mail distribution unit to the user terminal device of a user in the travel destination, and thereafter, the second e-mail is distributed thereto by the second e-mail distribution unit. The advertisement distribution device of the present invention is provided with a tourism resource information extraction unit, which enables the tourism resource information to be extracted in association with a position of the user at a predefined time specified from a travel schedule contained in the travel reservation information registered in the reservation information storing unit from the tourism resource storing unit. The extracted tourism resource information meets the actions of the user in the travel destination.

The advertisement distribution device of the present invention is provided with the embedded URL generation unit and the first e-mail generation unit, thereby, an embedded URL embedded with a transfer function to the URL of a web page contained in the tourism resource information and the user identification information contained in the user information can be generated, and at the meanwhile, the first e-mail having a link function to the embedded URL can be generated and distributed to the user terminal device of a user at the travel destination by the first e-mail distribution unit.

When the user who had received the first e-mail operates through selection the link function of the first e-mail distributed to the user terminal device, the web page of the tourism resource is sent to the user terminal device by the transfer function of the embedded URL. Meanwhile, the user identification information embedded in the embedded URL is extracted by the user specification unit and the user is specified thereby. In other words, according to the response (operating the link function through selection) of the user to the distributed first e-mail, it can be easily confirmed in the advertisement distribution device that the user is acting according to the travel schedule.

The advertisement information extraction unit refines advertisement information that should be provided to the user according to the location information contained in the tourism resource selected by the user and extracts it from the advertisement information storing unit. Thereafter, the second e-mail generation unit generates the second e-mail containing the advertisement information, and the second e-mail is distributed by the second e-mail distribution unit to the user terminal device of the user specified by the user specification unit.

Thereby, the optimum advertisement information can be provided to the user by the second e-mail. As a result thereof, the user can obtain information meeting the needs thereof from the advertisement information contained in the second e-mail, and the advertiser can have the CTR of an advertisement provided by the second e-mail improved.

It is preferable that the advertisement distribution device of the present invention is further provided with a genre specification unit configured to specify a genre in association with the tourism resource information denoted by the embedded URL operated through selection; the advertisement information storing unit stores the advertisement information in association with a genre; the tourism resource storing unit stores the tourism resource information in association with a genre; and the advertisement information extraction unit extracts the advertisement information further according to the genre specified by the genre specification unit. According thereto, the advertisement information is associated with the genre of the selected tourism resource, which enables useful information to be provided to the user.

It is preferable that the advertisement distribution device of the present invention is further provided with a travel merchandise storing unit preliminarily stored with a plurality of travel merchandise information; and a travel reservation unit configured to provide reservable travel merchandise information extracted from the travel merchandise storing unit to the user terminal device via the network, extract the user information and generate travel reservation information in association with the user according to a response from the user terminal device, wherein the travel reservation unit is configured to register the user information in the user information storing unit and the travel reservation information in the reservation information storing unit. Owing to the travel reservation unit, the travel merchandise information can be provided to the user terminal device for travel reservation and the user information can be extracted effectively and certainly.

The present invention provides an advertisement distribution method configured to distribute advertisement information to a user terminal device connected via a network. The advertisement distribution method of the present invention comprises: a tourism resource extraction step of extracting tourism resource information associated with a user position at a predefined time specified from a travel schedule contained in reservation information stored in a reservation information storing unit from a tourism resource storing unit preliminarily stored with a plurality of tourism resource information in association with location information according to the location information contained in the tourism resource information with reference to user information stored in a user information storing unit and travel reservation information of the user in association with the user information preliminarily stored in a reservation information storing unit; an embedded URL generation step of generating an embedded URL embedded with a transfer function to the URL of a web page contained in the tourism resource information extracted by the tourism resource information extraction step and user identification information; a first e-mail generation step of generating a first e-mail having a link function to the embedded URL generated by the embedded URL generation step; a first e-mail distribution step of distributing the first e-mail generated by the first e-mail generation step to the user terminal device; a user specification step of specifying the user according to the user identification information extracted from the embedded URL when the link function of the first e-mail distributed to the user terminal device is operated through selection; a location information specification step of specifying location information in association with the tourism resource information denoted by the embedded URL operated through selection; an advertisement information extraction step of extracting advertisement information to be provided to the user specified by the user specification step from the advertisement information storing unit stored with a plurality of advertisement information in association with location information according to the location information specified by the location information specification step; a second e-mail generation step of generating a second e-mail containing the advertisement information extracted by the advertisement information extraction step; and a second e-mail distribution step of distributing the second e-mail generated by the second e-mail generation step to the user terminal device of the user specified by the user specification step.

According to the advertisement distribution method of the present invention, the first e-mail is distributed by the first e-mail distribution step to the user terminal device of a user in the travel destination, and thereafter, the second e-mail is distributed thereto by the second e-mail distribution step. In the first e-mail, an embedded URL generated by the embedded URL generation step has a link function tagged by the first e-mail generation step. The web page URL with the embedded URL is contained in the tourism resource information stored in the tourism resource storing unit, and the tourism resource information is extracted from the tourism resource storing unit by the tourism resource extraction step. In the tourism resource extraction step, the tourism resource information associated with a user position at a predefined time specified from a travel schedule contained in reservation information stored in a reservation information storing unit is extracted from the tourism resource storing unit preliminarily according to location information contained in the tourism resource information.

After the first e-mail has been distributed by the first e-mail distribution step to the user terminal device of a user in the travel destination, when the user is traveling according to the travel schedule of the travel reservation information and the information desired by the user is sent by the first e-mail, the link function of the first e-mail is operated through selection by the user. Thus, when the link function to the tourism resource information distributed by the first e-mail is selected, it means that the user is traveling according to the travel schedule and the information desired by the user has been distributed by the first e-mail. According to the selection of the link function, the user identification information embedded in the embedded URL is extracted by the user specification step to specify the user. Thereafter, the advertisement information to be provided to the user is extracted from the advertisement information storing unit by the advertisement information extraction step.

Herein, the link function of the first e-mail is selected by the user, and the user is specified by the user specification step; thereby, according to the location information contained in the tourism resource selected by the user in the travel destination, the advertisement information that should be provided to the user can be refined with certainty. Subsequently, the second e-mail containing the refined advertisement information is generated by the second e-mail generation step and distributed by the second e-mail distribution step to the specified user, the user can obtain information meeting the needs thereof from the advertisement information contained in the second e-mail, and the advertiser can have the CTR of an advertisement provided by the second e-mail improved.

It is preferable that the advertisement distribution method of the present invention further comprises a genre specification step of specifying a genre in association with the tourism resource information denoted by the embedded URL operated through selection; wherein the advertisement information storing unit stores the advertisement information in association with a genre; the tourism resource storing unit stores the tourism resource information in association with a genre; and the advertisement information is extracted further according to the genre specified by the genre specification step in the advertisement information extraction step. According thereto, the advertisement information is associated with the genre of the selected tourism resource, which enables useful information to be provided to the user.

It is preferable that the advertisement distribution method of the present invention further comprises a travel reservation step of providing reservable travel merchandise information extracted from the travel merchandise storing unit preliminarily stored with a plurality of travel merchandise information to the user terminal device via the network, extracting the user information and generating travel reservation information in association with the user according to a response from the user terminal device; a user information registration step of registering the user information extracted by the travel reservation step in the user information storing unit; and a reservation information registration step of registering the travel reservation information generated by the travel reservation step in the reservation information storing unit, wherein the travel reservation step, the user information registration step and the reservation information registration step are performed prior to the tourism resource extraction step. Owing to the travel reservation step, the travel reservation information and the user information of the user can be extracted effectively and certainly in conjunction with the reservation of travel merchandise offered to the user terminal device.

The present invention provides an advertisement distribution program causing a computer to execute an advertisement distribution process in which advertisement information is extracted from an advertisement information storing unit stored with a plurality of advertisement information in association with location information and the extracted advertisement information is distributed to a user terminal device via a network. The advertisement distribution process comprises a position specification step of specifying a user position at a predetermined time according to a travel schedule contained in travel reservation information stored in a reservation information storing unit in association with user information stored in a user information storing unit; a tourism resource information extraction step of extracting tourism resource information associated with the position specified by the position specification step from a tourism resource storing unit stored with a plurality of tourism resource information in association with location information according to the location information contained in the tourism resource information; an embedded URL generation step of generating an embedded URL embedded with a transfer function to the URL of a web page contained in the tourism resource information extracted by the tourism resource information extraction step and user identification information contained in the user information; a first e-mail generation step of generating a first e-mail having a link function to the embedded URL generated by the embedded URL generation step; a first e-mail distribution step of distributing the first e-mail generated by the first e-mail generation step to the user terminal device; a user specification step of specifying the user according to the user identification information extracted from the embedded URL when the link function of the first e-mail distributed to the user terminal device is operated through selection; a location information specification step of specifying location information in association with the tourism resource information denoted by the embedded URL operated through selection; and advertisement information extraction step of extracting advertisement information to be provided to the user specified by the user specification step from the advertisement information storing unit according to the location information specified by the location information specification step; a second e-mail generation step of generating a second-email containing the advertisement information extracted by the advertisement information extraction step; and a second e-mail distribution step of distributing the second e-mail generated by the second e-mail generation step to the user terminal device of the user specified by the user specification step.

The present invention provides a computer readable record medium recorded with an advertisement distribution program causing a computer to execute an advertisement distribution process in which advertisement information is extracted from an advertisement information storing unit stored with a plurality of advertisement information in association with location information and the extracted advertisement information is distributed to a user terminal device via a network. The advertisement distribution process comprises a position specification step of specifying a user position at a predetermined time according to a travel schedule contained in travel reservation information stored in a reservation information storing unit in association with user information stored in a user information storing unit; a tourism resource information extraction step of extracting tourism resource information associated with the position specified by the position specification step from a tourism resource storing unit stored with a plurality of tourism resource information in association with location information according to the location information contained in the tourism resource information; an embedded URL generation step of generating an embedded URL embedded with a transfer function to the URL of a web page contained in the tourism resource information extracted by the tourism resource information extraction step and user identification information contained in the user information; a first e-mail generation step of generating a first e-mail having a link function to the embedded URL generated by the embedded URL generation step; a first e-mail distribution step of distributing the first e-mail generated by the first e-mail generation step to the user terminal device; a user specification step of specifying the user according to the user identification information extracted from the embedded URL when the link function of the first e-mail distributed to the user terminal device is operated through selection; a location information specification step of specifying location information in association with the tourism resource information denoted by the embedded URL operated through selection; and advertisement information extraction step of extracting advertisement information to be provided to the user specified by the user specification step from the advertisement information storing unit according to the location information specified by the location information specification step; a second e-mail generation step of generating a second-email containing the advertisement information extracted by the advertisement information extraction step; and a second e-mail distribution step of distributing the second e-mail generated by the second e-mail generation step to the user terminal device of the user specified by the user specification step.

BRIEF DESCRIPTION OF THE DRAWINGS

FIG. 4(*b*) is an explanatory diagram illustrating contents of information stored in a reservation information database.

FIG. 5 is an explanatory example of reservation records.

FIG. 8 is a flow chart illustrating a procedure performed in a travel support server and an advertisement server.

DETAILED DESCRIPTION OF THE PREFERRED EMBODIMENTS

Figure 1:
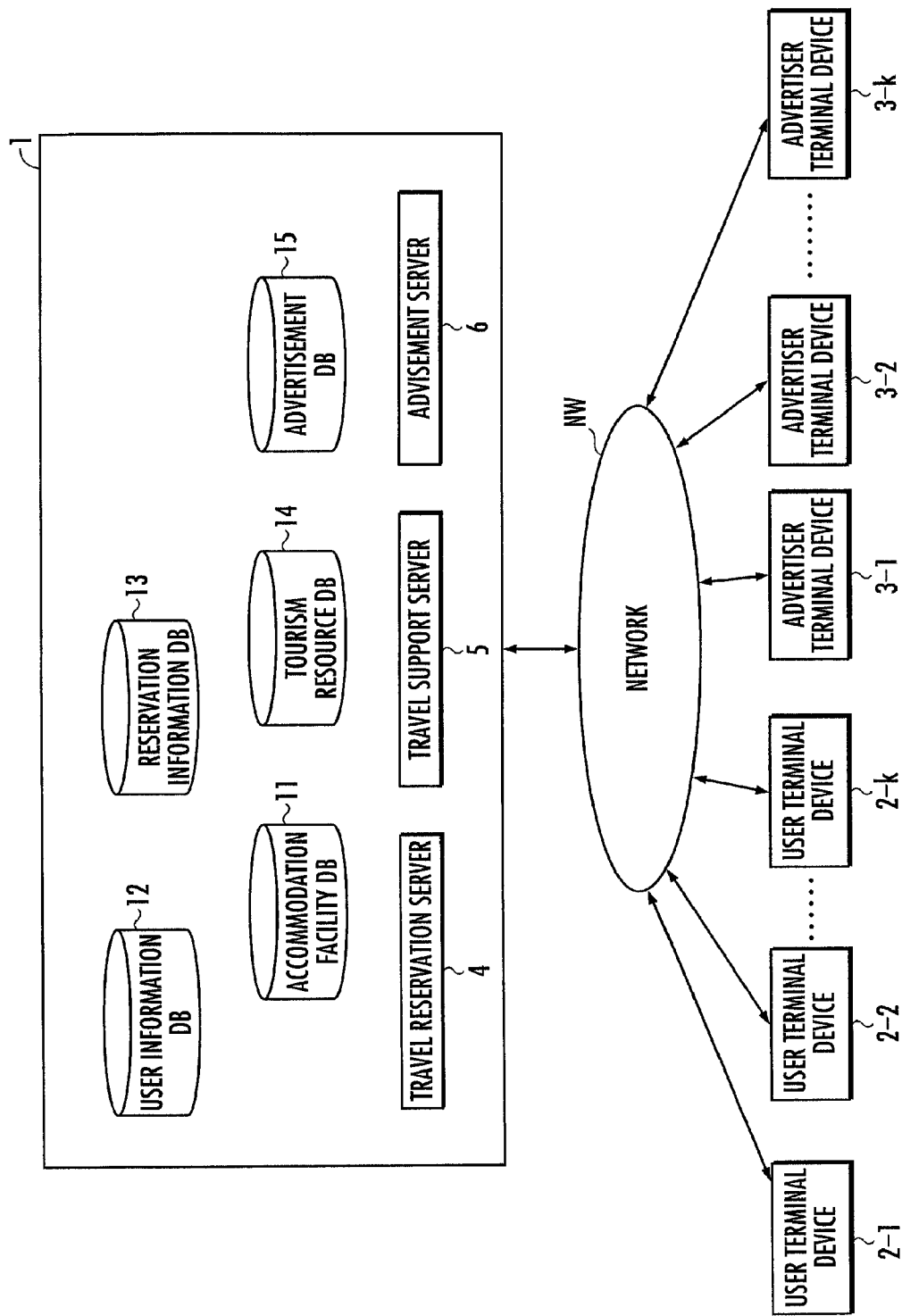
FIG. 1 is an explanatory diagram illustrating a schematic structure of an advertisement distribution system according to an embodiment of the present invention.

Hereinafter, an embodiment of the present invention will be described in detail with reference to the drawings. FIG. 1 illustrates a schematic structure of an advertisement distribution system according to the embodiment. As illustrated in FIG. 1, the advertisement distribution system is composed of an advertisement distribution device 1, a user terminal device 2-*k* (k=1, 2 . . . n), and an advertiser terminal device 3-*k* (k=1, 2 . . . n).

The advertisement distribution device 1 is composed of a travel reservation server 4 (travel reservation unit), a travel support server 5, and an advertisement server 6 (advertisement distribution unit). The advertisement distribution device 1 is connected to a network NW such as an internet network. The user terminal device 2-*k* and the advertiser terminal device 3-*k* are accessible to the network NW through a server such as an internet service provider. According thereto, the advertisement distribution device 1, the user terminal device 2-*k* and the advertiser terminal device 3-*k* can perform sending and receiving of data mutually through the network NW according to, for example, a TCP/IP protocol (Transmission Control Protocol/Internet Protocol) or the like.

In the example of FIG. 1, there are three functioning servers 4, 5 and 6 built in the advertisement distribution device 1; however, it is not limited thereto. It is acceptable to dispose a plurality of servers (namely, the travel reservation server, the travel support server, and the advertisement server) separately from the advertisement distribution device 1.

The user terminal device 2-*k* and the advertiser terminal device 3-*k*, which can be adopted from a personal computer (PC), a personal digital assistant (PDA), a mobile phone or the like installed with a web browser (software), are configured to display a web page provided from each of the servers 4, 5 and 6 of the advertisement distribution device 1 on a display section (for example, a liquid crystal display or the like), and send and receive e-mails through the network NW. The present embodiment will be explained with a mobile phone adopted as the user terminal device 2-*k*. In this case, the communication protocol is transferred by a gateway server which relays the communication between the internet and a mobile communication network.

Figure 2:
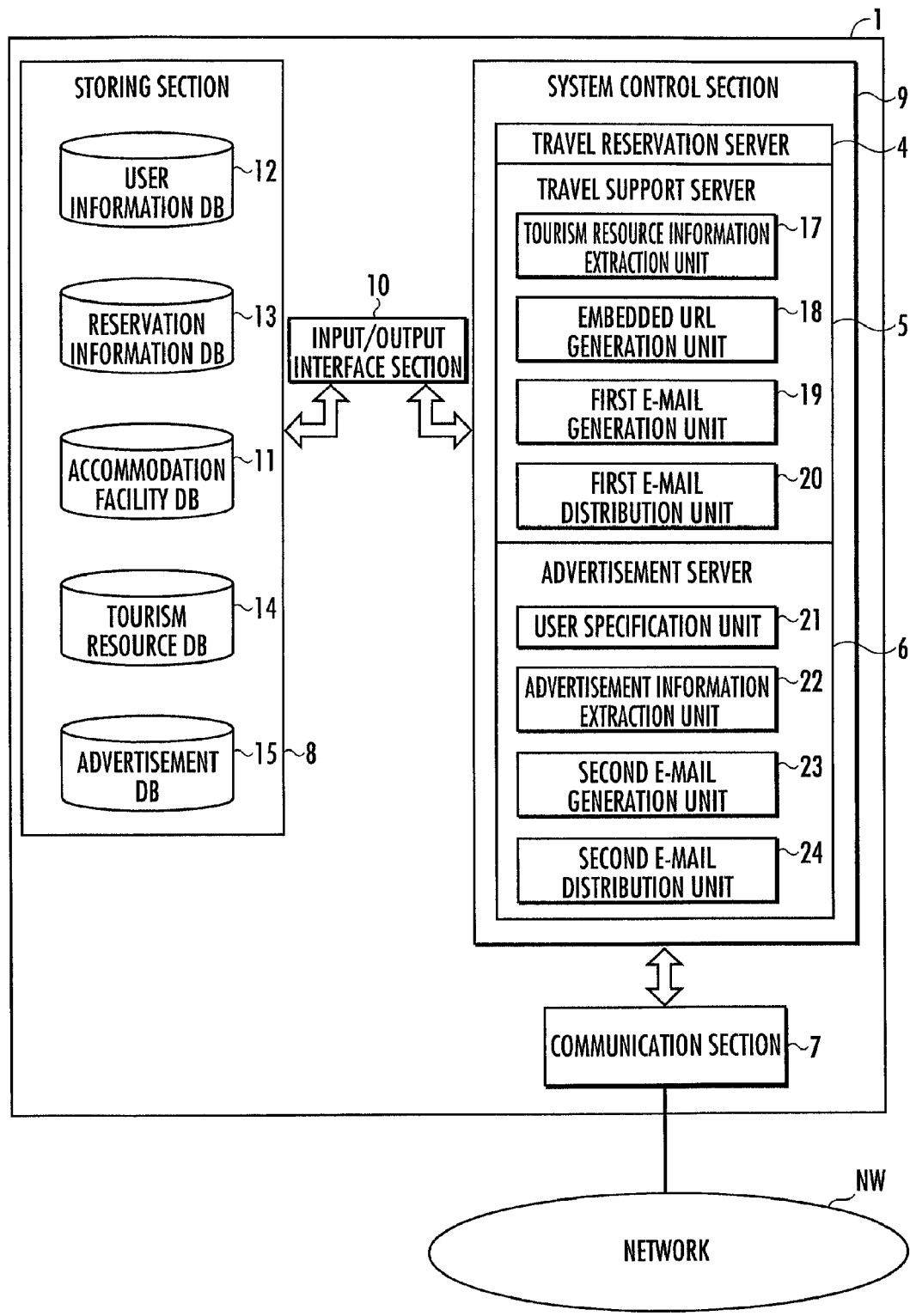
FIG. 2 is a block diagram illustrating a schematic structure of an advertisement distribution device according to an embodiment of the present invention.

The advertisement distribution device 1 composed of the travel reservation server 4, the travel support server 5 and the advertisement server 6, is a server device managed by a provider or the like of travel merchandise. Specifically, as illustrated in FIG. 2, the advertisement distribution device 1 is provided with a communication section 7 which is connected to the network NW and controls communication between the advertisement distribution device 1 and the user terminal device 2-*k* or the advertiser terminal device 3-*k*, a storing section 8 (such as a hard disk drive) which stores an operating system, various programs, data and the like, a system control section 9 (arithmetic computation circuit composed of CPU, ROM, RAM and the like) which performs various arithmetic computations, an input/output interface section 10 which performs interface processing between the storing section 8 and the system control section 9. Furthermore, it is also acceptable for the advertisement distribution device 1 to have a drive section capable of retrieving data from a recording medium such as a flexible disk, a compact disc (CD), a digital versatile disc (DVD) or the like and recording data or the like on the recording medium.

Hereinafter, the storing section 8 will be described in detail. As illustrated in FIG. 1 and FIG. 2, for storing data used by each of the servers 4, 5 and 6, the storing section 8 is built with an accommodation facility database 11, a user information database 12 (user information storing unit), a reservation information database 13 (reservation information storing unit), a tourism resource database 14 (tourism resource storing unit), and an advertisement database 15 (advertisement information storing unit).

Figure 3:
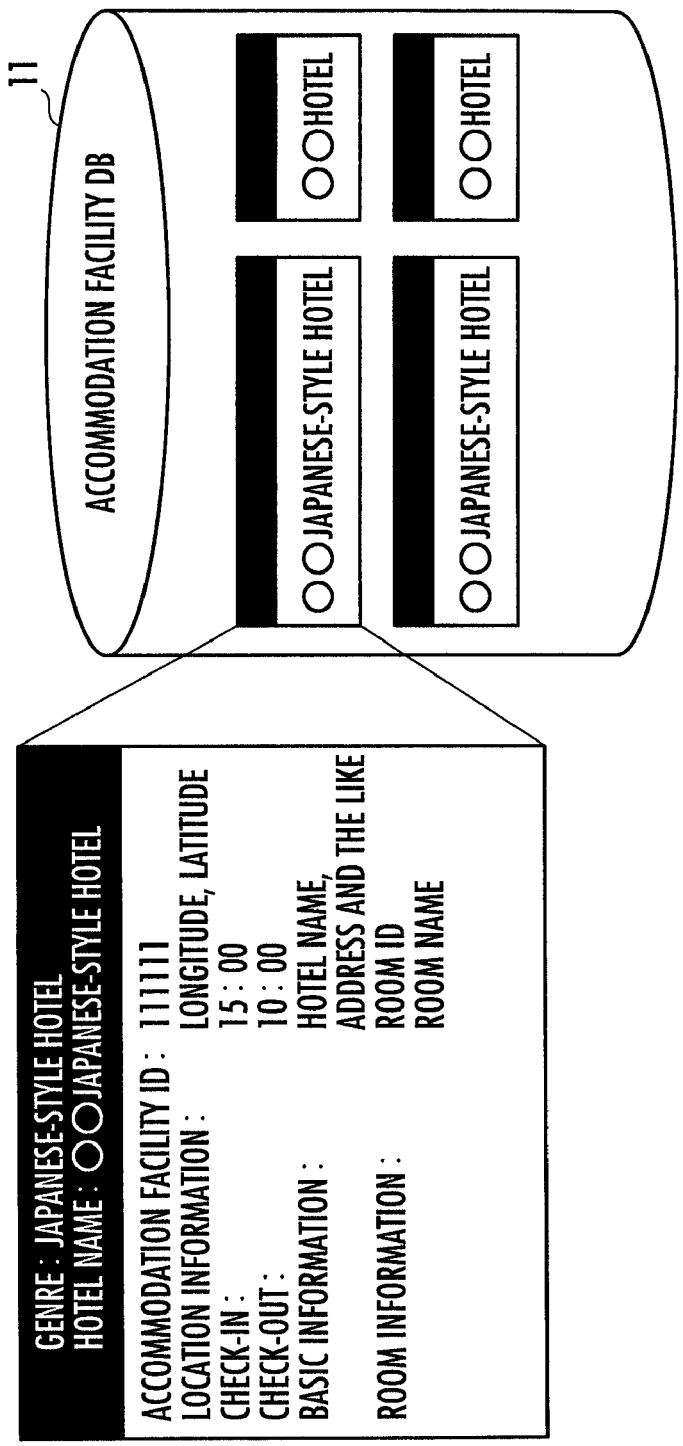
FIG. 3 is an explanatory diagram illustrating contents of information stored in an accommodation facility database.

The accommodation facility database 11 is given as an example of a travel merchandise database (travel merchandise storing unit) in the present invention. The accommodation facility database 11 is stored (registered) with information related to accommodation facilities. As illustrated in FIG. 3, for each accommodation facility, data such as accommodation facility ID, location information (latitude, longitude or the like), check-in time, check-out time, basic information (name, address, phone number and the like), room information, accommodation reservation conditions (unoccupied rooms) and the like are associated so that each accommodation facility can be distinguished by genre, facility name or the like thereof.

Figure 4:
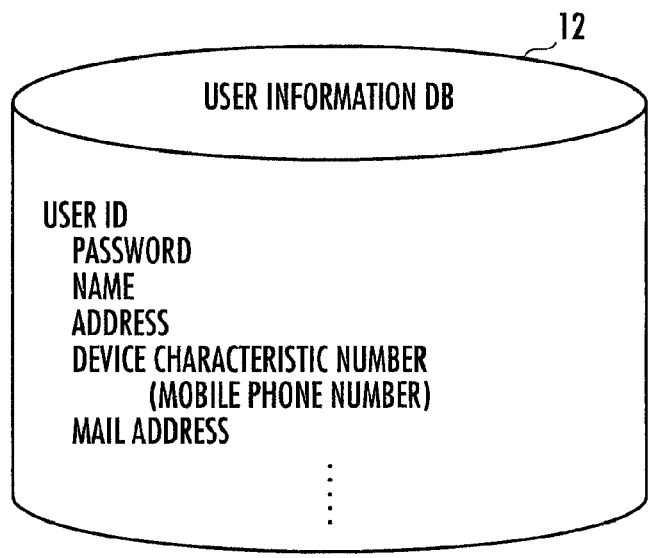
FIG. 4(*a*) is an explanatory diagram illustrating contents of information stored in a user information database.
Figure 4:
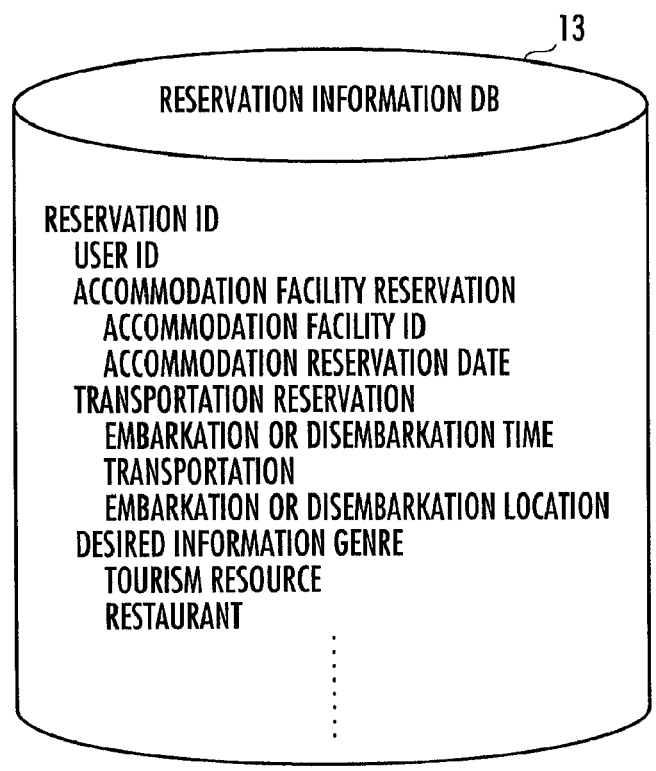

As illustrated in FIG. 4(*a*), the user information database 12 is stored (registered) with, for example, user ID, log-in password, user name, user address and phone number of the user, device characteristic number of a mobile phone or the like (or subscriber number), mail address and the like.

The reservation information database 13 is stored (registered) with, for example, a travel schedule or the like reserved by the user in association with user ID, accommodation facility ID or the like. As illustrated in FIG. 4(*b*), the reservation information database 13 is stored with reservation ID, user ID, accommodation facility ID, accommodation reservation date, transportation, embarkation or disembarkation time, embarkation or disembarkation location and the like. It is further preferable to register preliminarily genre (property) of information, tourism resource, restaurant and the like which are desired by the user in the reservation information database 13. Data registered in the reservation information database 13 is generated by the travel reservation server 4 to be described hereinafter. Specifically, as illustrated in FIG. 5 for example, the travel reservation server 4, on the basis of various reservation information input from the user terminal device 2-*k*, generates a reservation record 16 registered with user ID (associated with the user information stored in the user information database 12), flag (used to specify the user, which will be described later), numbers of adults, numbers of children, accommodation reservation date, accommodation facility ID (associated with the accommodation facility information stored in the accommodation facility database 11), accommodation facility location, scheduled check-in time, scheduled check-out time, departure place for outward journey, departure time for outward journey, departure flight number (in the case of airplane), arrival place for outward journey, arrival time for outward journey, departure place for homeward journey, departure time for homeward journey, arrival flight number (in the case of airplane), arrival place for homeward journey, arrival time for homeward journey and the like, and register the reservation record 16 in the reservation information database 13. It is acceptable to refer to the accommodation facility database 11 according to the accommodation facility ID and acquire the accommodation facility location from the accommodation facility database 11. When there is no input concerning the scheduled check-in time and the scheduled check-out time from the user, it is acceptable to refer to the accommodation facility database 11 and acquire them from the accommodation facility database 11. Further, it is also acceptable to acquire the departure time and the arrival time from a flight database (not shown) on the basis of the flight number.

Figure 6:
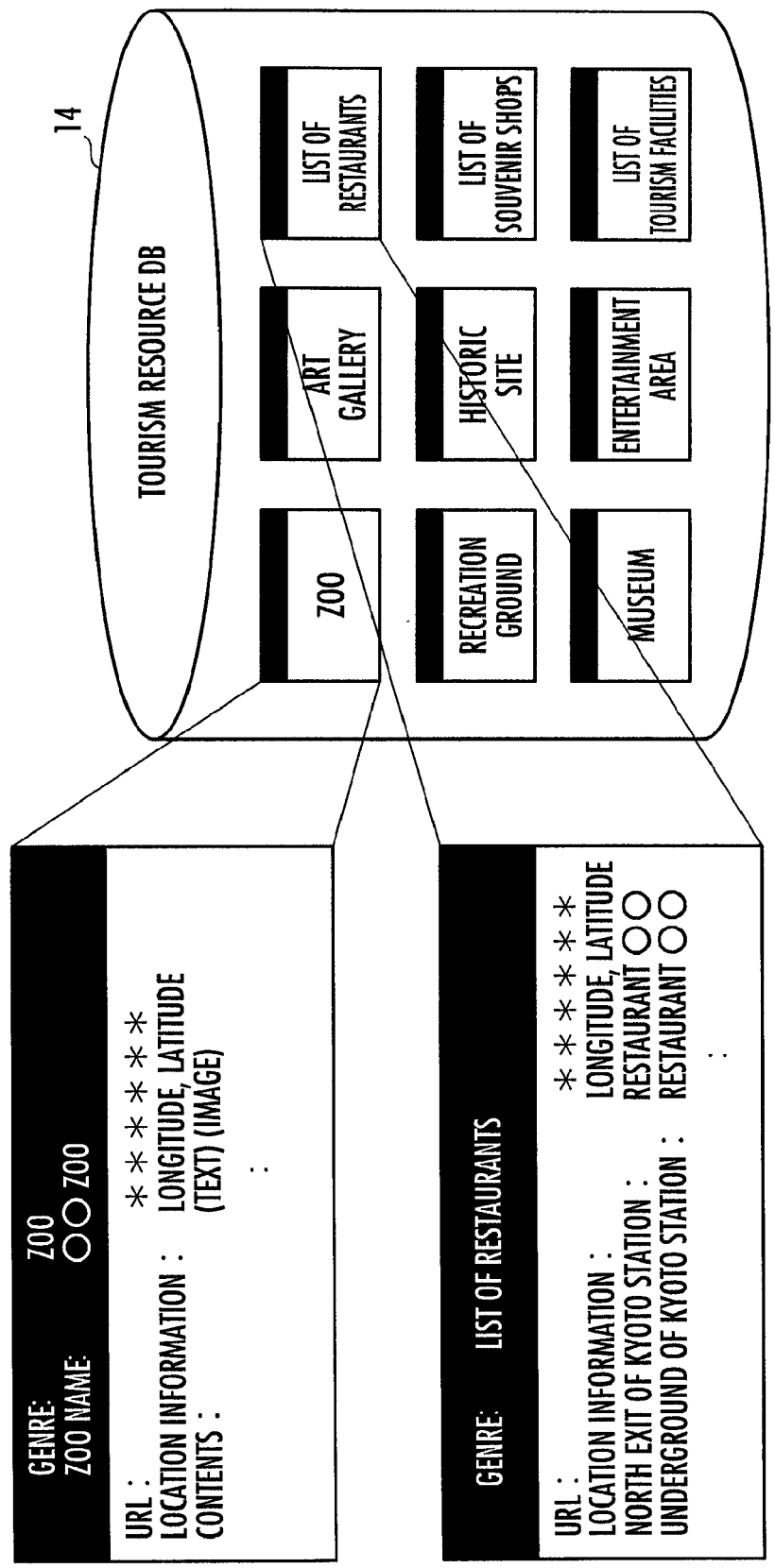
FIG. 6 is an explanatory diagram illustrating contents of information stored in a tourism resource database.

As illustrated in FIG. 6, the tourism resource database 14 is stored (registered) with, for example, facility name, web page URL of each facility (hereinafter, referred to as facility URL), facility location (longitude and latitude, or the like), contents (text data, images or the like) for each genre such as zoo, recreation ground, museum, art gallery, historic site, entertainment area and the like. It is also acceptable to include a list of restaurants, a list of souvenir shops, and a list of tourism facilities as genres and register the web page URL where each list is published, the facility location (longitude and latitude, or the like), list contents (shop name or the like) in the tourism resource database 14.

Figure 7:
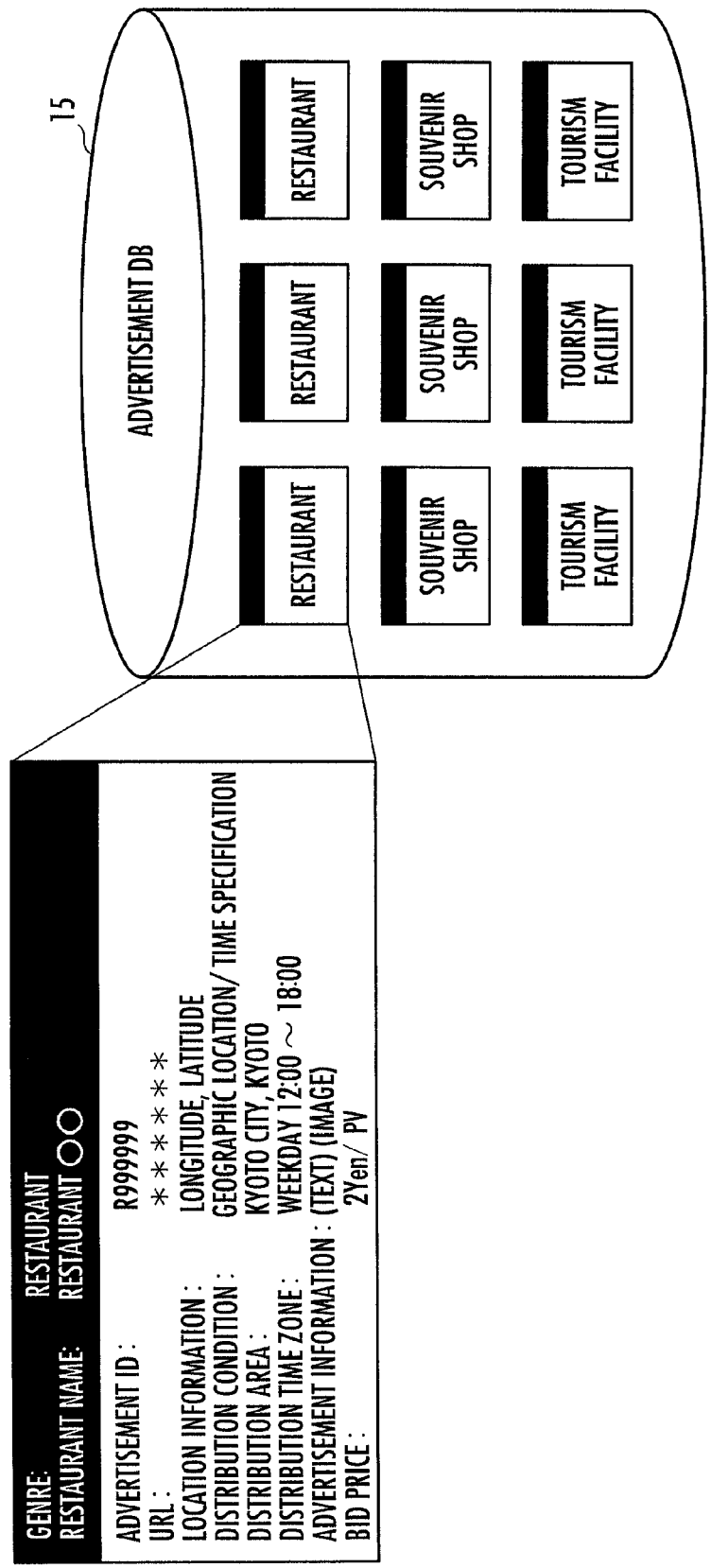
FIG. 7 is an explanatory diagram illustrating contents of information stored in an advertisement database.

As illustrated in FIG. 7, the advertisement database 15 is stored (registered) with advertisement name, advertisement ID, web page URL managed by each advertiser (hereinafter, referred to as advertisement URL), location (longitude and latitude, or the like), distribution conditions such as distribution area or distribution time zone, advertisement contents (text data, images or the like), bid price (unit price) for determining publication order, and the like for each genre such as a restaurant, a souvenir shop, a tourism facility or the like. The data registered in the advertisement database 15 is generated by the advertisement server 6 to be described hereinafter. There are two types of bid prices in the data registered in the advertisement database 15. One of which is the publication fee of advertisement contained in the first e-mail which is firstly distributed to a user desired for advertisement. The other one of which is the publication fee of advertisement contained in the second e-mail which is distributed to the user after the user has responded to the first e-mail which is initially distributed to the user desired for advertisement. It is also acceptable to bill the advertiser when there is a click-through in place of the publication fee.

The system control section 9 retrieves various programs stored in the storing section 8 and executes the retrieved programs, and thereby, controls each section disposed in the advertisement distribution device 1 and functions as the travel reservation server 4, the travel support server 5 and the advertisement server 6. As illustrated in FIG. 2, when functioning as the travel support server 5, the system control section 9 is provided with a tourism resource information extraction unit 17, an embedded URL generation unit 18, a first e-mail generation unit 19 and a first e-mail distribution unit 20; when functioning as the advertisement server 6, it is provided with a user specification unit 21, an advertisement information extraction unit 22, a second e-mail generation unit 23 and a second e-mail distribution unit 24. In the present embodiment, the first e-mail and the second e-mail are distributed separately by the respective e-mail sending unit (not shown), or are distributed collectively by a mail server disposed independent from the advertisement distribution device 1.

The operations of the travel support server 5 and the advertisement server 6 will be described hereinafter. Prior to the operations thereof, data is registered in the advertisement database 15, the user information database 12 and the reservation information database 13. Specifically, when a piece of advertisement is input from the advertiser terminal device 3-*k* connected through the network, the advertisement server 6 registers the advertisement information provided from the advertiser terminal device 3-*k* in the advertisement database 15 (advertisement information registration step). Moreover, the travel reservation server 4 extracts a plurality of reservable accommodation facilities (accommodation facility information) from the accommodation facility database 11 and provides the extracted accommodation facilities to the user terminal device 2-*k* via the network NW. The user operates the user terminal device 2-*k* to make selections from the accommodation facilities provided from the accommodation facility database 11, and performs the reservation. After receiving the travel reservation operation from the user, the travel reservation server 4 extracts the user information and generates the reservation information associated with the user (travel reservation step). In the present embodiment, although a database in association with transportation is not shown, the travel reservation server 4 works together with a system for reserving transportation via carriers such as air planes or railways to set a travel schedule containing transportation, that is, the travel reservation server 4 generates the aforementioned reservation record 16 illustrated in FIG. 5. Subsequently, the generated reservation record 16 is registered in the reservation information database 13 (reservation information registration step).

After the registration of data in the reservation information database 13, the travel schedule of the user can be referred from the reservation information database 13. Thus, as illustrated in FIG. 8, firstly, at STEP 1, the travel support server 5 acquires the user traveling in the travel destination at a specified time (or date) and the position information of the user from the reservation information database 13. Herein, whether or not the user is moving actually is ignored, the travel support server 5 acquires the user and the position information thereof according to the data stored in the reservation information database 13. The position information denotes the position of the user at a predefined time specified from the travel schedule contained in the reservation information. The timing for acquiring the position information is triggered at a time prior to the predefined time. Specifically, for each record illustrated in FIG. 5, when the time stored in the column of arrival time or check-in for outward journey is within a predefined interval (for example, within three hours), the information related to the longitude and the latitude is acquired for each user ID.

Subsequently, at STEP 2, the tourism resource information extraction unit 17, on the basis of the user position specified at the predefined time, extracts the tourism resource information associated with the user position and acquires the facility URL of the tourism resource from the tourism resource database 14 (tourism resource extraction step). Thereafter, at STEP 3, the embedded URL generation unit 18 generates the embedded URL (embedded URL generation step). The embedded URL is generated by adding a direct function (transfer function) to the facility URL acquired by the tourism resource information extraction unit 17 and building therein the user ID (user identification information) of the user acquired from the reservation information database 13. It is preferable to encode the user ID built in the embedded URL. In addition to the user ID, it is also acceptable that a device characteristic number or a subscriber number of a mobile phone is acquired with reference to the user information database 12 as the user identification information and the device characteristic number or the subscriber number is encoded and is built into the embedded URL. The embedded URL may be generated by using special application software or by using a CGI mounted in the travel support server 5. An example of the embedded URL is given below:

http://travel.com/redirect?100100?http://abc-zoo.net

"http://travel.com" in the embedded URL allocates a server where a transaction is firstly established by the user terminal device. In the present embodiment, it refers to the URL of a site running in the advertisement distribution device. The description of "redirect" is related to "redirect" in the server; however, it is not limited thereto, it may be an arbitrary description which can be recognized by the advertisement distribution device as "redirect". The description of "100100" refers to the user ID of the user who has sent the e-mail. In the abovementioned example, the user ID is not encoded; however, it would be encoded in practical use. "http://abc-zoo.net" is the site URL of a tourism resource.

Thereafter, at STEP 4, the first e-mail is generated by the first e-mail generation unit 19 (first e-mail generation step). Herein, the first e-mail generation unit 19 generates the first e-mail with the link function to the embedded URL built in the text (facility name of the tourism resource or guidance text or the like) or an image contained in the body of the e-mail. At STEP 5, the first e-mail distribution unit 20 acquires the e-mail address of the user from the user information database 12, and distributes the first e-mail to the user terminal device 2-*k* of the user at STEP 6 (first e-mail distribution step). In addition to putting an embedded URL in the body of the first e-mail, a piece of advertisement may also be published in the body of the first e-mail.

The user receives the first e-mail from the user terminal device 2-*k* such as a mobile phone in the travel destination. Although it is possible that the user may cancel the scheduled travel, change or joining another agency to travel differently from the scheduled travel, the first e-mail is distributed with reference to the reservation information database 13.

Since the first e-mail is distributed according to the travel schedule of the user, it corresponds to the actions of the user. When the link function of the first e-mail is selected by the user at STEP 7, the user terminal device 2-*k* sends a request-to-send to the target page of the embedded URL via a web browser (STEP 8). The advertisement distribution device 1 receives the request to the page of a tourism resource site such as "http://abc-zoo.net" from the user terminal device. Meanwhile, the advertisement distribution device 1 acquires the redirect information and the user ID contained in the embedded URL from the user terminal device. Thereby, at STEP 9, the user specification unit 21 of the advertisement server 6 specifies the user with reference to the user information database 12 on the basis of the user ID in the embedded URL (user specification step). After the user has been specified, the advertisement server 6 sets a flag in the flag area of the reservation record 16 (refer to FIG. 5) in the reservation information database 13 at STEP 10. The flag denotes the following meanings: (1) the user is using the user terminal device 2-*k*; (2) the user is in an environment where the user terminal device 2-*k* such as a mobile phone can be used; (3) the user is acting according to the schedule; and (4) the user has interest in the tourism resource on the target page.

Subsequently, the advertisement distribution device 1 performs redirecting transaction based on the redirect function of the embedded URL (STEP 11) and sends the facility URL to the user terminal device 2-*k* (STEP 12). In the user terminal device 2-*k* which has received the facility URL, a request-to-send treatment is performed by the web browser thereof (STEP 13), and a request-to-send is sent to a web server 25 running for the facility (STEP 14). Accordingly, at STEP 15, a web page is sent to the user terminal device 2-*k* from the web server 25 running for the facility, and at STEP 16, the web page is displayed on the user terminal device 2-*k*.

Thereafter, the advertisement distribution device 1 acquires the information genre (property), the tourism resource, restaurants and the like which are desired by the user with reference to the reservation information database 13. Then, the advertisement distribution device 1 takes the genre related to the tourism resource in which the user has interest or the location information close to the tourism resource in which the user has interest as a condition, at STEP 17, the advertisement information extraction unit 22 of the advertisement server 6 extracts the advertisement information to be provided to the specified user from the advertisement database 15 (advertisement information extraction step). For example, for a user having interest in a zoo, advertisement information related to a tourism facility and a souvenir shop having location information geographically close to the zoo, both of which are stored in the advertisement database 15, is extracted. Then, at STEP 18, the second e-mail published with the extracted advertisement information is generated by the second e-mail generation unit 23 (second e-mail generation step). In the body of the second e-mail, a text (advertised facility name or guidance text or the like) or an image may be published, or the URL of a web page managed by the advertiser may be included. At STEP 19, the e-mail address of the user is acquired from the user information database 12, and at STEP 20, the second e-mail is distributed by the second e-mail distribution unit 24 to the user terminal device 2-*k* (second e-mail distribution step).

Thereby, according to the response of the user to the first e-mail, (1) the user is using the user terminal device; (2) the user is in an environment where the user terminal device such as a mobile phone can be used; (3) the user is acting according to the schedule; and (4) the user has interest in the tourism resource on the target page can be confirmed, thus, the user will respond better when a further e-mail is sent, which makes the refinement of information which should be provided to the user easily and certainly, and accordingly, the optimum information to the user can be provided by the second e-mail. Consequently, the user can obtain information meeting the needs thereof effectively, and the advertiser can have the CTR of an advertisement improved.

In the abovementioned embodiment, it is described that the travel reservation server 4 is disposed to register the user information in the user information database 12 in travel reservation and to register the travel reservation information in the reservation information database 13 so as to acquire the user information and the travel reservation information associated with the travel reservation server 4; however, it is possible to acquire the user information and the travel reservation information preliminarily via the user terminal device 2-*k* by the travel support server 5 or the advertisement server 6 if the travel reservation server 4 is not disposed.

Moreover, information registered (stored) in each of the databases 11, 12, 13, 14, and 15 is not limited to those given in the abovementioned embodiment, it can be changed or added appropriately.

What is claimed is:

1. An advertisement distribution system which is provided with a non-GPS enabled user terminal device accessible to a network, an advertisement database registered with a plurality of advertisement information in association with location information, and an advertisement server configured to distribute advertisement information extracted from the advertisement database to the user terminal device via the network, comprising:
   a user information database configured to store user information;
   a reservation information database configured to store travel reservation information of the user in association with the user information;
   a tourism resource database registered with a plurality of tourism resource information in association with the location information; and
   a travel support server configured to extract tourism resource information from the tourism resource database,
   the travel support server is provided with
      a tourism resource information extraction unit configured to extract the tourism resource information in association with a position of the user within a predefined time interval around a predefined time at which the user is expected to be in proximity to the position specified from a travel schedule contained in the travel reservation information stored in the reservation information database from the tourism resource database according to the location information contained in the tourism resource information;
      an embedded URL generation unit configured to generate an embedded URL embedded with a transfer function to the URL of a web page contained in the tourism resource information extracted by the tourism resource information extraction unit and user identification information contained in the user information;
      a first e-mail generation unit configured to generate a first e-mail having a link function to the embedded URL generated by the embedded URL generation unit; and
      a first e-mail distribution unit configured to distribute, within said predefined time interval, the first e-mail generated by the first e-mail generation unit to the user terminal device,
   the advertisement server is provided with
      a location information specification unit configured to specify location information associated with the tourism resource information denoted by the embedded URL operated through selection;
      an advertisement information extraction unit configured to extract advertisement information to be provided to the user specified by the user specification unit from the advertisement database according to the location information specified by the location information specification unit;
      a second e-mail generation unit configured to generate a second e-mail containing the advertisement information extracted by the advertisement information extraction unit; and
      a second e-mail distribution unit configured to distribute the second e-mail generated by the second e-mail generation unit to the user terminal device of the user specified by the user specification unit,
   wherein if the link function in the first email is selected by the user, an indication is given that the user is acting according to the travel schedule and is assumed to be in proximity to the position specified from the travel schedule.

2. The advertisement distribution system according to claim 1, wherein
   the advertisement server is provided with a genre specification unit configured to specify a genre in association with the tourism resource information denoted by the embedded URL operated through selection;
   the advertisement information is registered in association with a genre in the advertisement database;
   the tourism resource information is registered in association with a genre in the tourism resourced database; and
   the advertisement information extraction unit extracted the advertisement information further according to the genre specified by the genre specification unit.

3. The advertisement distribution system according to claim 1 is further provided with
   a travel merchandise database registered with a plurality of travel merchandise information; and
   a travel reservation server configured to provide reservable travel merchandise information extracted from the travel merchandise database to the user terminal device via the network, extract the user information and generate travel reservation information in association with the user according to a response from the user terminal device,
wherein the travel reservation server is configured to register the user information in the user information database and the travel reservation information in the reservation information database.

4. An advertisement distribution device, which includes at least one processor and a memory, is connected by a non-GPS enabled user terminal device via a network, and is provided with an advertisement information storing nit stored with a plurality of advertisement information in association with location information and an advertisement distribution unit configured to distribute advertisement information extracted from the advertisement information storing unit to the user terminal device comprising:
   a user information storing unit configured to store user information;
   a reservation information storing unit configured to store travel reservation information of the user in association with the user information;
   a tourism resource storing unit preliminarily stored with a plurality of tourism resource information in association with location information;
   a tourism resource information extraction unit configured to extract the tourism resource information in association with a position of the user within a predefined time interval around a predefined time at which the user is expected to be in proximity to the position specified from a travel schedule contained in the travel reservation information stored in the reservation information storing unit from the tourism resource storing unit according to location information contained in the tourism resource information;
   an embedded URL generation unit configured to generate an embedded URL with a transfer function to the URL of a web page contained in the tourism resource information extracted by the tourism resource information extraction unit and user identification information contained in the user information;
   a first e-mail generation unit configured to generate a first e-mail having a link function to the embedded URL generated by the embedded URL generation unit;
   a first e-mail distribution unit configured to distribute, within said predefined time interval, the first e-mail generated by the first e-mail generation unit to the user terminal device,
   a user specification unit configured to specify the user according to the user identification information extracted from the embedded URL when the link function of the first e-mail distributed to the user terminal device is operated through selection;
   a location information specification unit configured to specify location information in association with the tourism resource information denoted by the embedded URL operated through selection;
   an advertisement information extraction unit configured to extract advertisement information to be provided to the user specified by the user specification unit from the advertisement information storing unit according to the location information specified by the location information specification unit;
   a second e-mail generation unit configured to generate a second e-mail containing the advertisement information extracted by the advertisement information extraction unit; and
   a second e-mail distribution unit configured to distribute the second e-mail generated by the second e-mail generation unit to the user terminal device of the user specified by the user specification unit,
   wherein if the link function in the first email is selected by the user, an indication is given that the user is acting according to the travel schedule and is assumed to be in proximity to the position specified from the travel schedule.

5. The advertisement distribution device according to claim 4 is further provided with a genre specification unit configured to specify a genre in association with the tourism resource information denoted by the embedded URL operated through selection;
   wherein the advertisement information storing unit store advertisement information in association with a genre;
   the tourism resource storing unit stores the tourism resource information in association with a genre; and
   the advertisement information extraction unit extracts the advertisement information further according to the genre specified by the genre specification unit.

6. The advertisement distribution device according to claim 4 is further provided with
   a travel merchandise storing unit preliminarily stored with a plurality of travel merchandise information; and
   a travel reservation unit configured to provide reservable travel merchandise information extracted from the travel merchandise storing unit to the user terminal device via the network, extract the user information and generate travel reservation information in association with the user according to a response from the user terminal device,
   wherein the travel reservation unit is configured to register user information in the user information storing unit and the travel reservation information in the reservation information storing unit.

7. An advertisement distribution method configured to distribute advertisement information to a non-GPS enabled user terminal device connected via a network comprising:
   a tourism resource extraction step, performed by a processor, of extracting tourism resource information associated with a user position within a predefined time interval around a predefined time at which the user is expected to be in proximity to the position specified from a travel schedule contained in reservation information stored in a reservation information storing unit from a tourism resource storing unit preliminarily stored with a plurality of tourism resource information in association with location information according to the location information contained in the tourism resource information with reference to user information stored in a user information storing unit and travel reservation information of the user in association with the user information preliminarily store in a reservation information storing unit;
   an embedded URL generation step, performed by a processor, of generating an embedded URL embedded with a transfer function to the URL of a web page contained in the tourism resource information extracted by the tourism resource information extraction step and user identification information;
   a first e-mail generation step, performed by a processor, of generating a first e-mail having a link function to the embedded URL generated by the embedded URL generation step;
   a first e-mail distribution step, performed by a processor, of distributing, within said predefined time interval, the first e-mail generated by the first e-mail generation step to the user terminal device;

a user specification step, performed by a processor, of specifying the user according to the user identification information extracted from the embedded URL when the link function of the first e-mail distributed to the user terminal device is operated through selection;

a location information specification step, performed by a processor, of specifying location information in association with the tourism resource information denoted by the embedded URL operated through selection;

an advertisement information extraction step, performed by a processor, of extracting advertisement information to be provided to the user specified by the user specification step from the advertisement information storing unit stored with a plurality of advertisement information in association with location information according to the location information specified by the location information specification step;

a second e-mail generation step, performed by a processor, of generating a second e-mail containing the advertisement information extracted by the advertisement information extraction step; and a second e-mail distribution step, performed by a processor, of distributing the second e-mail generated by the second e-mail generation step to the user terminal device of the user specified by the user specification step, wherein if the link function in the first email is selected by the user, an indication is given that the user is acting according to the travel schedule and is assumed to be in proximity to the position specified from the travel schedule.

8. The advertisement distribution method according to claim 7 further comprises a genre specification step of specifying a genre in association with the tourism resource information denoted by the embedded URL operated through selection, wherein the advertisement information storing unit stored the advertisement information in association with a genre;

the tourism resource storing unit stores the tourism resource information in association with a genre; and the advertisement information is extracted further according to the genre specified by the genre specification step in the advertisement information extraction step.

9. The advertisement distribution method according to claim 7 further comprises a travel reservation step, performed by a processor, of providing reservable travel merchandise information extracted from the travel merchandise storing unit preliminarily stored with a plurality of travel merchandise information to the user terminal device via the network, extracting the user information and generating reservation information in association with the user according to a response from the user terminal device;

a user information registering step, performed by a processor, of registering the user information extracted by the travel reservation step in the user information storing unit; and a reservation information registration step, performed by a processor, of registering the reservation information generated by the travel reservation step in the reservation information storing unit, wherein the travel reservation step, the user information registration step and the reservation information registration step are performed prior to the tourism resource extraction step.

10. An advertisement distribution program embodied on a non-transitory computer readable storage medium for causing a computer to execute an advertisement distribution process in which advertisement information is extracted from an advertisement information storing unit stored with a plurality of advertisement information in association with location information and the extracted advertisement information is distributed to a non-GPS enabled user terminal device via a network, the advertisement distribution process comprises a position specification step of specifying a user position within a predefined time interval around a predefined time at which the user is expected to be in proximity to the position according to a travel schedule contained in travel reservation information stored in a reservation information storing unit in association with the user information stored in a user information storing unit;

a tourism resource information extraction step of extracting tourism resource information associated with the position specified by the position specification step from a tourism resource storing unit stored with a plurality of tourism resource information in association with location information according to the location information contained in the tourism resource information; A first e-mail generation step of generating a first e-mail having a link function to the embedded URL generated by the embedded URL generation step;

an embedded URL generation step of generating an embedded URL embedded with a transfer function to the URL of a web page contained in the tourism resource information extracted by the tourism resource information extraction step and user identification information;

a first e-mail generation step of generating a first e-mail having a link function to the embedded URL generated by the embedded URL generation step;

a first e-mail distribution unit configured to distribute, within said predefined time interval, the first e-mail generated by the first e-mail generation unit to the user terminal device;

a user specification step of specifying the user according to the user identification information extracted from the embedded URL when the link function of the first e-mail distributed to the user terminal device is operated through selection;

a location information specification step of specifying location information in association with the tourism resource information denoted by the embedded URL operated through selection;

an advertisement information extraction step of extracting advertisement information to be provided to the user specified by the user specification step from the advertisement information storing unit stored with a plurality of advertisement information in association with location information according to the location information specified by the location information specification step;

a second e-mail generation step of generating a second e-mail containing the advertisement information extracted by the advertisement information extraction step; and a second e-mail distribution step of distributing the second e-mail generated by the second e-mail generation step to the user terminal device of the user specified by the user specification step;

wherein if the link function in the first email is selected by the user, an indication is given that the user is acting according to the travel schedule and is assumed to be in proximity to the position specified from the travel schedule.

11. A non-transitory computer readable storage medium on which an advertisement distribution program is stored causing a computer to execute an advertisement distribution process in which advertisement information is extracted from an advertisement information storing unit stored with a plurality of advertisement information in association with location information and the extracted advertisement information is distributed to a user terminal device via a network, the advertisement distribution process comprises a position specification step of specifying a user position within a predefined time interval around a predefined time at which the user is expected to be in proximity to the position according to a travel schedule contained in travel reservation information stored in a reservation information storing unit in association with user information stored in a user information storing unit;

a tourism resource information extraction unit configured to extract the tourism resource information in association with a position of the user within a predefined time interval around a predefined time at which the user is expected to be in proximity to the position specified from a travel schedule contained in the travel reservation information stored in the reservation information database from the tourism resource database according to the location information contained in the tourism resource information;

an embedded URL generation step of generating an embedded URL embedded with a transfer function to the URL of a web page contained in the tourism resource information extracted by the tourism resource information extraction step and user identification information;

a first e-mail generation step of generating a first e-mail having a link function to the embedded URL generated by the embedded URL generation step;

a first e-mail distribution unit configured to distribute, within said predefined time interval, the first e-mail generated by the first e-mail generation unit to the user terminal device, a location information specification step of specifying location information in association with the tourism resource information denoted by the embedded URL operated through selection;

an advertisement information extraction step of extracting advertisement information to be provided to the user specified by the user specification step from the advertisement information storing unit stored with a plurality of advertisement information in association with location information according to the location information specified by the location information specification step;

a second e-mail generation step of generating a second e-mail containing the advertisement information extracted by the advertisement information extraction step; and a second e-mail distribution step of distributing the second e-mail generated by the second e-mail generation step to the user terminal device of the user specified by the user specification step, wherein if the link function in the first email is selected by the user, an indication is given that the user is acting according to the travel schedule and is assumed to be in proximity to the position specified from the travel schedule.

* * * * *